US00RE34063E

United States Patent [19]

Vincent et al.

[11] E Patent Number: Re. 34,063

[45] Reissued Date of Patent: Sep. 15, 1992

[54] MONITORING TORQUE IN TUBULAR GOODS

[76] Inventors: Darrell L. Vincent, 7950 Locke La., #10, Houston, Tex. 77063; Larry W. Vincent, 965 Lakeview Dr., Montgomery, Tex. 77353; John E. Shaunfield, 1101 Rainbow, Richardson, Tex. 75081

[21] Appl. No.: 510,539

[22] Filed: Apr. 17, 1990

Related U.S. Patent Documents

Reissue of:

[64] Patent No.: 4,738,145
Issued: Apr. 19, 1988
Appl. No.: 383,516
Filed: Jun. 1, 1982

[51] Int. Cl.[5] ..... G01L 5/24; B25B 23/14

[52] U.S. Cl. ..... 73/862.23; 73/761; 29/407; 364/508

[58] Field of Search ..... 73/761, 862.23, 862.24, 73/862.25; 29/407, 240; 173/12; 364/508

[56] References Cited

U.S. PATENT DOCUMENTS

| | | | |
|---|---|---|---|
| 1,985,916 | 1/1935 | Coates et al. | 73/862.23 X |
| 3,596,718 | 8/1971 | Fish et al. | 73/862.23 X |
| 3,603,144 | 9/1971 | Smith | 73/862.23 X |
| 3,693,727 | 9/1972 | Bell | 173/12 |
| 4,199,032 | 4/1980 | Weiner et al. | 73/862.27 X |
| 4,305,472 | 12/1981 | Brossette | 173/12 |
| 4,365,402 | 12/1982 | McCombs et al. | 73/862.23 X |

*Primary Examiner*—Charles A. Ruehl

[57] ABSTRACT

The torque imposed on premium thread connections between tubular goods is monitored and plotted as a function of time rather than the number of turns. In this manner, the torque at which "shoulder", either by metal-to-metal sealing contact or otherwise, is achieved during make-up of the premium connection can be detected. Further, torque response of the connection after shoulder may be monitored. In addition, torque conditions during back out or disconnection may be monitored. Data obtained indicate if connections and seals are acceptable or not and often furnish evidence of the reason for certain types of unsatisfactory connections.

63 Claims, 7 Drawing Sheets

MONITORING TORQUE IN TUBULAR GOODS

Matter enclosed in heavy brackets [ ] appears in the original patent but forms no part of this reissue specification; matter printed in italics indicates the additions made by reissue.

BACKGROUND OF INVENTION

1. Field of Invention

The present invention relates to monitoring of torque in connections between tubular goods, particularly in the petroleum industry.

2. Description of Prior Art

In the petroleum industry, failure of tubing or tubular goods has severe consequences. Replacing failed tubing in a well may often be more expensive than the expected value of oil or gas to be produced from the well. In gas wells where the gas is sour, containing hydrogen sulfide, a leak or failure in tubing could have fatal consequences.

Based on a study conducted some years past by a major oil company, it has long been customary in the connection, or make-up, of petroleum tubular goods with conventional, American Petroleum Institute, or API, specification threads to monitor both torque and turns of the tubular goods being made up. Unless both the torque and turns observed during make-up fell within specified limits of acceptability, a connection was rejected as unsatisfactory. Examples of this type of "torque-turns" monitoring are described in U.S. Pat. Nos. 3,368,396; 3,606,664; 3,745,820; 4,091,451; 4,176,436; 4,199,032; 4,208,775; 4,208,919 and 4,210,017. An article in Petroleum Engineering International, "Torque Turn in Principle and Practice", pp. 62 et al., Jul., 1980 provides a general summary of this technique.

As the petroleum industry has gone deeper into the earth in exploratory and production wells, higher pressures have been encountered. For this and other reasons, specially threaded connections known as premium connections have been used in petroleum industry tubular goods. This type of connection is based on metal-to-metal sealing or "shoulder" connect along specially shaped areas of the pin and box members being connected. As pressure increased in the tubular goods, metal-to-metal sealing contact increased in the premium connections. Examples of premium threaded connections are described in U.S. Pat. Nos. Re. 30,647 and 4,244,607.

However, torque-turn monitoring was not well adapted for premium connections, since shoulder could occur in a much smaller portion of a turn than the intervals, usually tenths, into which one revolution of a pipe was divided for monitoring turns. There have been indications that reducing the size of turn interval might help in shoulder contact detection, but this would require a substantial increase in the number of lugs or projections formed for turn interval division purposes on the rotary jaw member of the power tongs used in makeup of petroleum tubular goods.

SUMMARY OF THE INVENTION

Briefly, the present invention provides a new and improved method and apparatus for monitoring torque conditions during the make-up of premium tubular connections, particularly in the petroleum industry. As a particular connection is being made up, the torque imposed on the connection is sensed. The sensed torque is displayed as a function of time, and the torque conditions are monitored to detect if a metal-to-metal seal, or shoulder contact, is obtained. Since shoulder contact is typically achieved in a very small portion of a turn or revolution of a connection during make up, it has been found with the present invention that monitoring torque as a function of time, rather than turns, provides a surprising and unexpected improvement in monitoring and analysis of premium connections of tubular goods.

In detecting a shoulder contact condition, the torque imposed during two successive time intervals is monitored and an indicating of the change is formed. When this indication of the change exceeds a specified shoulder torque rate, a shoulder condition is achieved. Depending upon the torque at which the shoulder condition occurred, a satisfactory or an unsatisfactory connection is indicated. Acceptable maximum and minimum torque levels for achieving the shoulder condition are specified. The maximum acceptable torque level represents an upper torque limit which, if exceeded, is an indication of an unsuitable connection or joint which should be rejected. The minimum acceptable torque level represents a threshold torque value below which the shoulder condition must be achieved. If the shoulder condition is not achieved before the minimum acceptable torque level is reached, an unsuitable connection is formed and should be rejected.

Additionally, for premium connections which use the shoulder contact as a primary seal, an acceptable torque differential imposed after the shoulder contact condition is obtained may also be specified. Once the shoulder contact condition is achieved, the acceptable torque differential is combined with the torque level at which shoulder contact was achieved, in effect serving as a new acceptable minimum level. This level represents the total torque which the connection must be able to take in service conditions to seal against well pressures. If the connection in question cannot obtain the total of shoulder torque and torque differential, it is not acceptable since it could fail in service use. Also, the total of shoulder torque and differential torque is compared with the acceptable maximum torque level at the time shoulder is obtained. If the total torque exceeds the acceptable maximum, make up is stopped to prevent damage to the connection.

When satisfactory torque levels and differentials are obtained during make-up of a connection, a satisfactory connection is indicated. If any of the specified torque levels or differentials are not met, an unsatisfactory connection is indicated. Also, if any maximum torque level or differential is exceeded, an unsatisfactory connection is indicated.

If no shoulder is indicated as being achieved, an unsatisfactory connection is also indicated. Also, torque may be monitored as a function of time during disconnection or backout of the premium tubular connection to detect, among other things, possible thread galling.

DESCRIPTION OF PREFERRED EMBODIMENT

I. INTRODUCTION

Figure 1:
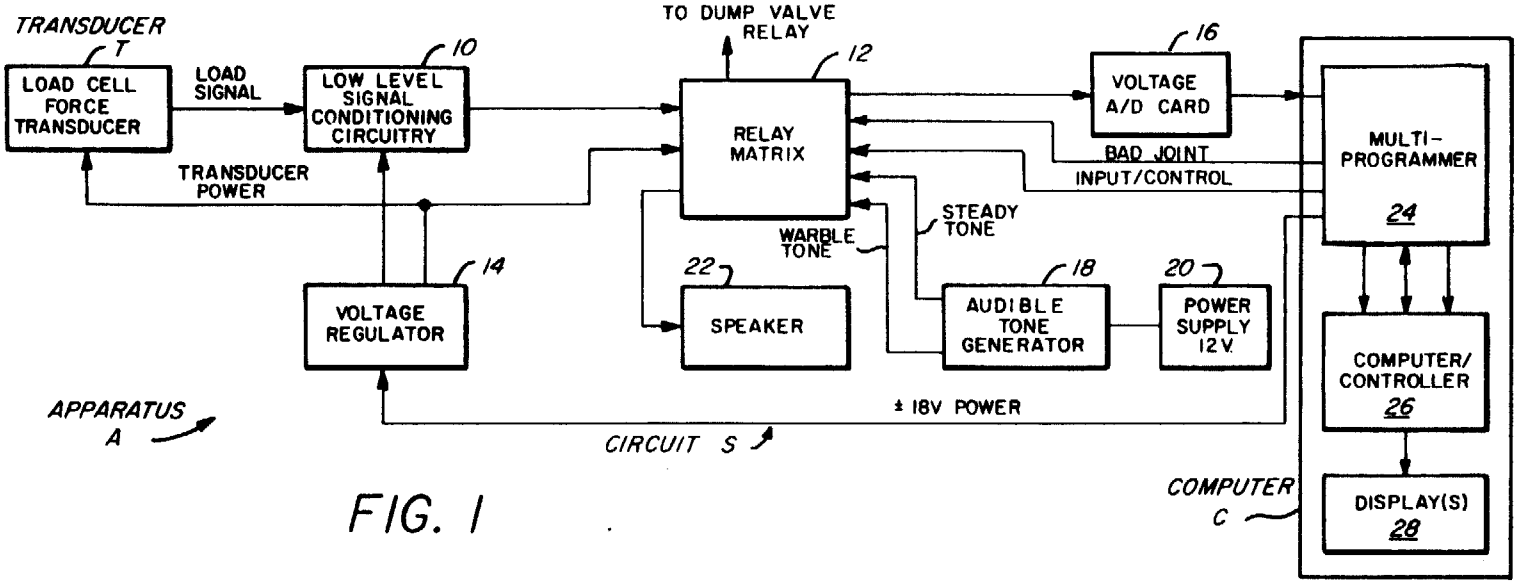
FIG. 1 is a schematic electrical circuit diagram of an apparatus, according to the present invention.

In the drawings, the letter A designates generally an apparatus according to the present invention for monitoring torque conditions during the makeup or interconnection of a premium tubular connection or joint. As used in the present invention, the term premium is to be understood to be that generally understood in the petroleum industry. One type of premium connection is a threaded interconnection between pipes accomplishing a primary metal-to-metal seal along a surface known as a shoulder between the two tubular members being interconnected, although it should be understood that other types of premium threaded connections, such as those with primary sealing by thread interference or at other surfaces than the shoulder, may be monitored as well. Premium threaded connections have come to be increasingly widely used, due to higher pressure requirements for tubular goods for safety reasons, and further as deeper wells to higher pressure formations have been drilled.

II. APPARATUS

The apparatus A may be used at any number of suitable locations such as pipe yards, wells or drilling rigs or at test facilities to monitor torque in threaded connections. The apparatus A includes a load cell transducer T suitably mounted for mechanical interconnection, such as by a lever arm, to any suitable type of threaded pipe connecting apparatus, generally referred to in the petroleum industry as power tongs. Such a connection of threaded members is usually referred to in the petroleum industry as make-up, while a disconnection is often generally referred to in the petroleum industry as a backout. As will be set forth, the apparatus A in addition to monitoring the torque conditions as the threaded connection is being formed or made up may also be used to monitor disconnecting or backout operations, equally as well.

In the apparatus A, the transducer T is electrically connected through a signal conditioning/switching circuit S to a computer C. Electrical signals formed in the transducer T indicative of torque conditions in a threaded connection being monitored are passed through the circuit S to the computer C, which monitors such signals. The computer C also controls the operation of the circuit S, in a manner to be set forth, so than indication of whether a particular connection is satisfactory or unsatisfactory may be furnished to an equipment operator responsible for monitoring the various connections in question.

Considering the apparatus A more in detail the transducer T may be any suitable transducer, such as a force transducer providing an output electrical signal indicative of the torque being applied to the pipe joint or connection being made up. The signal formed in the transducer T is furnished to a conditioning amplifying circuit 10 of the circuit S where gain adjustment and amplification of the signal from the transducer T is accomplished. In the event that the length or spacing of the transducer T from the connection being monitored is changed between monitoring operations, calibrating adjustments may be made in the circuit 10 or in the computer C as required. The signal received from the transducer T and passed through the circuit 10 represents the torque being imparted to the connection being monitored.

The main adjusted, amplified signal from the circuit 10 is furnished to a relay matrix or switching matrix circuit 12 of the circuit S. The matrix circuit 12 may be a matrix of controllable electric switches or relays or a matrix of controllable electronic or digital switching circuits, as desired. The matrix circuit 12 operates under the control of signals furnished from the computer C, routing signals to the computer C on request and transferring instructions from the computer C to other portions of the apparatus A, as well as to indicators and to the control equipment for the power tongs applying torque to the connection currently being monitored.

Operating power is provided for the transducer T, circuit 10 and matrix circuit 12 through a voltage regulator 14 controlled by the computer C. The matrix circuit 12 transfers the amplified torque signals representing the torque being measured through an analog-to-digital (A/D) converter circuit 16 where the torque signals received in analog format from the transducer T are converted into a digital format compatible for processing in the computer C.

The matrix circuit 12 also permits indications of the acceptability of the joint being made up to be sent by an operator of the apparatus A to an operator of the power tongs applying torque to the joint. As an example, distinguishable audible signals or tones are formed in a tone generator 18, powered by a battery or power supply 20 and transferred through matrix 12 to a horn or speaker 22 to indicate the condition of a connection being formed. In one embodiment, a warbling tone from the generator 18 passes through the matrix circuit 12 to the speaker 22 to indicate that an unacceptable connection is being or has been formed, while a steady tone is permitted to pass from the generator 18 through the matrix 12, under control of the computer C, to the speaker 22 when an acceptable connection is being or has been formed. The matrix circuit 12 additionally transfers a control signal to a dump valve relay of the type used in conventional power tongs in order that make-up, whether unacceptable or acceptable, of a particular connection by the power tongs may be terminated at an appropriate time. Provision of such signal is schematically indicated in FIG. 1 in the drawings.

The computer C may be any suitable portable, general purpose programmable digital computer. Computer C includes an input/output unit or multiprogrammer 24 by means of which commands and data are interchanged between the circuit S and the computer C. The operation of the multiprogrammer 24 is controlled by a main computer/control unit 26 operating under the control of a program P (FIGS. 2A, 2B, 2C and 2D) in response to received data, causing the apparatus A to monitor torque as a function of time according to the present invention. A display or display units 28 are provided in the computer C to form visible output indications (FIGS. 3, 4A through 4F inclusive, 5, 6A and 6B) of data obtained with the apparatus A. The display unit 28 may have one or more types of displays. One group of displays found particularly suitable for the present invention includes both a dynamic display unit, such as a cathode ray tube (CRT), and a tangible record forming unit such as a printer. The dynamic display unit permits an operator to monitor progress of each connection or joint as it is being made up, while the printer may be used to form a permanent record for the owner or user of the tubular goods of torque performance characteristics of the connections of such tubular goods.

III. TORQUE-TIME MONITORING

With the present invention, applicants have determined that the prior tubular goods torque monitoring techniques, with the acceptability-nonacceptability criteria being based on the interrelationship between the torque sensed and the number of turns made during make-up, are unacceptable. Specifically, since a shoulder condition can be achieved in a smaller portion of a turn of the connection than that usually sensed in torque-turn monitoring, the prior torque-turns technique and philosophy are substantially unsuitable for premium threaded connections.

With the present invention, applicants have found that monitoring torque conditions as a function of elapsed time once an initial reference torque has been reached permits an operator of apparatus according to the present invention to initially detect whether or not the shoulder conditions is achieved in making up a premium threaded connection. In addition, when a shoulder condition is achieved, the torque performance characteristics of the threaded connection may be monitored and recorded to determine whether or not such a threaded connection would be acceptable for service use, over and above a suitable shoulder being achieved.

For instance, a threaded connection exhibiting a suitable shoulder might be intended for service use where a specific additional amount of torque performance is required once shoulder condition is reached, usually in instances where the shoulder functions as a primary seal. Thus, even though an acceptable shoulder might be formed, two unacceptable unknowns might still be present in the joint. First, the joint might not be capable of accepting the requisite additional sealing torque. Second, shoulder might occur at such a high level that a specified maximum torque limits would be exceeded. Thus, the apparatus A permits advanced planning of torque performance characteristics of premium threaded connections and further permits monitoring to insure that these planned conditions are not only met but also not exceeded.

Thus, with the present invention, acceptable maximum and minimum torque levels for achieving shoulder condition are specified. Further, an acceptable torque differential which may be imposed after shoulder condition is obtained may also be specified. If a shoulder is achieved before the minimum torque level is reached, a satisfactory shoulder is achieved. If the minimum torque is exceeded before shoulder, the joint is unacceptable. The maximum torque limit must not, however, be exceeded after shoulder is achieved.

Once a satisfactory shoulder condition is achieved, the acceptable torque differential is added or combined with the shoulder torque at which the shoulder condition was achieved. If the combined torques exceeds the maximum acceptable torque, make-up of the connection is stopped to prevent damage to the connection. Further, if the joint cannot achieve the combined torques, meaning that the specified supplemental sealing torque cannot be obtained in the joint, the joint is indicated to be unsatisfactory.

Thus, once satisfactory torque levels, and differential if desired, are achieved during make-up, a satisfactory connection is indicated. However, if the specified minimum torque level is exceeded or if the differential level is not met or if the maximum torque level is exceeded, an unsatisfactory condition is indicated. Further, in the event that no satisfactory shoulder condition is indicated as being achieved, an unsatisfactory connection is also indicated. Finally, torque may also be monitored as a function of time during disconnection or backout of the premium tubular connection to detect, among other things, possible galling of the threads.

Figure 3:
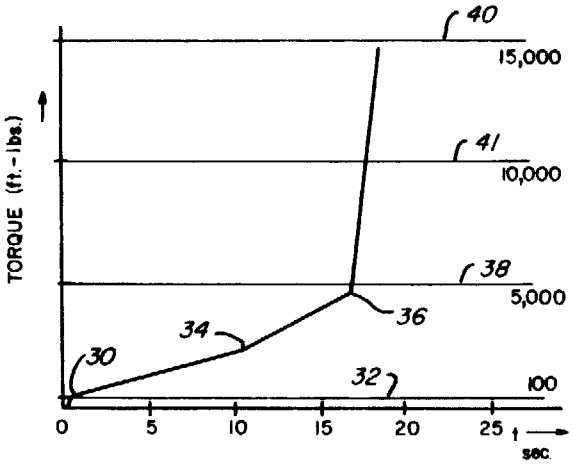
FIG. 3 is a graphical representation of a torque measured as a function of time with the apparatus of FIG. 1 for a satisfactory premium tubular connection make up.

In FIG. 3, an example plot of torque versus time for an acceptable threaded premium connection make-up according to the present invention is set forth. Turning to FIG. 3, shortly after the connection is started and torque application begun, the measured torque T exceeds at a point 30 a set minimum reference torque at a level indicated by a line 32. This torque level is generally low, on the order of one-hundred or so foot pounds. As torque continues to be applied to the connection, the measured torque increases as a function of time in a substantially linear manner, with certain relatively minor torque rate increases such as that indicated at 34, until a point 36 is reached at which an abrupt change in torque rate occurs.

With the present invention, it has been found that time of such an abrupt change in torque rate represents the point in time at which a shoulder condition is achieved in premium threaded connections. By monitoring for this point in time, rather than observing specified acceptable torque levels as a function of a particular number of turns or fractional turns in the make-up of the threaded connection, it has been found that surprising and unexpectedly good torque monitoring results, particularly for premium threaded connections, can be achieved.

Accordingly, apparatus A operates to determine whether an acceptable minimum torque, as indicated by a line 38, has been exceeded at the time when a shoulder contact condition is sensed. If the minimum torque has been exceeded, the joint is indicated as unsatisfactory. The apparatus A also monitors to detect when an acceptable maximum torque, indicated by line 40, is exceeded in a premium threaded connection. If this occurs, the joint is indicated to be unsatisfactory. If the shoulder condition occurs at a torque below the specified minimum level, a satisfactory connection has been achieved and is indicated by the speaker 22, in a manner to be set forth below, under control of the computer C.

In addition, the torque performance of premium connections once the shoulder condition is achieved and detected may be monitored and recorded for acceptable connections. Thus, an acceptable minimum torque differential which must be imposed for the joint being monitored may be established in the apparatus A. The accepted minimum torque differential is added to the torque value at the time at which the shoulder condition is achieved to define a minimum acceptable torque differential indicated at line 41 which must be exceeded for the connection to be completely satisfactory. Additionally, the combined minimum acceptable torque differential and detected shoulder torque may be compared with the maximum torque indicated by line 40 at the time the shoulder condition is detected. If the maximum acceptable torque is the lower value of the two values being compared, the make-up may be stopped to prevent thread damage.

IV. OPERATION OF APPARATUS

Turning now to the program P, a desired ordered sequence of steps for controlling the operation of the computer C to cause the apparatus A to monitor torque as a function of time according to the present invention is set forth. The program P sets forth in flow chart form sufficient information to enable a competent computer programmer of ordinary skill in the computer programming art to program a general purpose digital computer, by way of example a Hewlett-Packard HP-85 computer, using a program language such as BASIC, to monitor and plot torque as a function of time. The program P when selected is entered in a process step 100 after which control is transferred to a step 102, causing all counters and storage locations to be cleared and set to zero values. A step 104 then assumes control of the computer C to permit a user to establish certain parameters or numerical values of interest for the torquing conditions under observation.

Control is then transferred to step 106 to display the parameters being set up, after which an instruction 108 causes the control section 26 of the computer C to instruct the display 28 to establish the proper graphic parameters for displaying torque as a function of time. An instruction or step 110 assumes control of the computer C to permit any of several functions to be performed at the discretion of the user. The special functions established in step 110 permit a user to depress a key and modify the parameter values of various readings of interest for torquing conditions, such as the shoulder torque rate, acceptable torque differential, reference torque level, minimum torque level, and maximum torque level to be selectively changed. Further, the torque indicated under no load conditions may be displayed and a compensatory reading entered into the computer C.

A decision instruction 112 then causes the computer C to inquire through the display 28 of an operator whether or not any of the displayed parameters are to be changed. If such is the case, control is transferred back to step 104 so that such changes may be made. If no changes are desired, the established parameters are then stored on a data disk for record purposes. An instruction 116 then causes the load cell voltage of the transducer at no load conditions to be transferred to the computer C through the matrix circuit 12. Correction is then performed under control of a step 118 for the requisite amount of amplification for calibration purposes and a step 128 calculates the proper amount of offset voltage to compensate for the no load cell voltage in step 116. A decision instruction 122 causes steps 116, 118 and 128 to be repeatedly performed until the measured torque at no load conditions is zero.

Once this condition is achieved, control of the computer C is transferred to a step 124 at which time the computer C is in a standby condition until torquing begins on a particular connection being tested. Once torquing conditions begin, the load cell voltage from the trasducer T is measured during a step 126 and compensation performed for the offset voltage during a step 128 until make-up torque, indicated by the reference torque level 32 (FIG. 3) has been detected to be achieved during a decision instruction 130. Until such make-up torque is achieved, decision instruction 130 transfers control to a step 132 where the measured torque voltage is multiplied by a scaling factor and displayed during a step 134 on a dynamic display.

Once the make-up torque level has been detected to be achieved by a decision instruction 130 in the computer C, control is transferred to a step 136 (FIG. 2B) causing the graphic grid, such as that of FIG. 3, without any torque or time readings thereon to be displayed on the dynamic display.

An instruction 138 assumes control of the computer C and inquires whether any keys should be set for the run mode at this particular time. Example types of keys which are set for controlling subsequent operations of the computer C during torque monitor operations are those permitting the operator to clear the time reading, i.e. reset elapsed time to zero for beginning torque monitoring for a new connection; sounding the horn 22 to alert the tong operator; stopping operation of the horn 22; resetting the horn 22 for detecting a new alarm condition; restarting torquing operations; causing the computer to store particular data values and continue operations; and, finally, restarting torquing operations.

An instruction 140 is then given control of the computer C so that make-up of a connection may be continued. Thereafter, control is transferred to a step 142 and the signal level from the load cell or transducer T is measured and transferred to the computer C. In the computer C, an instruction 144 assumes control of operations and causes the offset voltage stored in memory to be subtracted from the level measured during instruction 142. In a decision instruction 146, the resultant value from subtraction step 144 is compared with the reference torque level to determine whether or not reference torque has been achieved. If reference torque has not been achieved, the value formed in instruction 144 is multiplied by a scaling factor in a step 148 and displayed on the dynamic display 150 before control is returned to instruction 142. Simultaneously with performance of the steps 148 and 150, an instruction IS2 causes a change to be made to the time value and an instruction 154 causes the time value to be displayed.

Performance of steps 142, 144 and 146 and iterations through these steps continue until decision instruction 146 determines that reference torque has been exceeded, at which time control is transferred to an instruction 156 causing a time counter to begin timing operations. Next, a decision instruction 158 compares the present time, as the time is successively incremented, with the established maximum time. If the maximum time has been exceeded, control is transferred to an instruction 160 which causes the time reading to be set to zero and time to be scaled and plotted on the dynamic display during steps 162 and 164, after which, control is transferred to instruction 154. Until the measured time exceeds the established maximum time, control is transferred from decision instruction 158 to a decision instruction 166.

For operations of the computer C initially after reference torque has been exceeded, decision instruction 166 transfer control to an instruction 168 which causes a temporary array of transducer measurements or load cell voltages to be created. The purpose of the temporary array is to permit the computer C to retain only a predetermined lesser number of torque and time readings to be stored until a shoulder condition has been obtained. At this time, the computer C is caused to change operations so that each torque and time reading are stored in memory. For example, the number X defining the number of data storage locations in the temporary array $A_{1,x}$ may be set at four or five. After performance of the step 168, a decision instruction 170 determines whether or not the highest number of storage locations in the temporary array created during step 168 has been achieved. If this is the case, control is transferred to an instruction 172 which causes the counter counting the number $A_x$ in the temporary array to reset to zero. Control is then transferred to a decision instruction 174 which detects whether or not a shoulder condition flag has been sensed. If such condition has not been sensed, control is transferred to an instruction 176 which causes the computer C to save only a predetermined fraction, such as one of four or five of the data points, and clear the temporary array during a step 178 while tagging during a step 180 (FIG. 2C) the last torque reading as being the identical torque reading which occurs at each time interval of monitoring.

Control is then transferred to an instruction 182 which increments storage location counter $A_x$, after which an instruction 184 causes the load cell voltage sensed by the transducer T to be temporarily stored. An instruction 188 causes the highest torque value previously sensed to be stored, and thereafter a decision instruction 190 compares this stored highest torque value with the specified maximum torque. If the stored value is less than the specified maximum torque, control is transferred to a decision instruction 192.

In decision instruction 192, the torque imposed on the connection during successive time intervals is compared and an indication of the change in torque between successive time intervals is formed. If this indication of change is greater than the specified shoulder torque rate established in the input parameters, a shoulder condition has occurred, and an instruction 194 causes a shoulder flag indicator to be set in the computer C while an instruction 196 causes the torque value at which shoulder occurred to be stored. Control is thereafter transferred to an instruction 198 which determines a minimum acceptable torque differential level. This level is achieved by forming a sum signal which represents the sum of the torque level at which the shoulder condition is achieved and a specified acceptable minimum torque differential, representing the additional torque which the connection in question must undergo after the shoulder condition is achieved before an acceptable connection is present. If it is not necessary or desirable to monitor torque performance after a satisfactory shoulder condition is obtained, the differential may be set as zero or at some miniscule number of foot-pounds of torque.

Returning again to decision instruction 192, in the event a shoulder condition has not been achieved, as indicated during decision instruction 192, control is transferred to a decision instruction 200 to determine whether or not the currently measured torque value exceeds the minimum torque with no shoulder being detected. If this is the situation, control is transferred to an instruction 202 which causes a bad connection flag to be set in computer C causing the dump relay of the power tongs to be activated during an instruction 204 through the switching matrix 12, and concurrently a bad connection indication to be indicated on the speaker 22 under control of the computer C during an instruction 206.

If, however, torque conditions are still within acceptable limits at the time of performance of decision instruction 200 and instruction 198, control is transferred to a decision instruction 208. During instruction 208, a determination is made as to whether or not the presently sensed torque level is greater than the minimum torque level as well as the minimum torque differential level. If this is not the case, control of the computer C is returned to instruction 162 (FIG. 2B) for time scaling purposes and simultaneously to an instruction 210 for torque scaling purposes. Thereafter, instruction 164 causes the time to be plotted on the dynamic display, while simultaneously, an instruction 212 causes the observed or monitored torque to be plotted on the dynamic display. Control is then returned to the step 142 for continuation of torque monitoring as a function of time in the manner set forth above.

Should, however, the presently monitored torque be greater than the minimum torque and the factored minimum torque, instruction 208 (FIG. 2C) transfer control of the computer C to an instruction 214 which causes a good connection flag to be set, thereafter transferring control to an instruction 216 which causes the dump valve relay controlling the dump valve on the power tongs to be activated during a step 216, after which the speaker 22 is caused to give off a good connection indication by means of the matrix circuit 12 in response to the computer C operating an instruction 218.

After the step 218, an operator of the computer C is questioned by a decision instruction 220 (FIG. 2D) as to whether or not make-up of the connection is to continue: if this is the case, an instruction 222 causes the horn and dump valve to be reset and control is transferred to step 210 and 162 (FIG. 2B) so that operations may continue in the manner set forth above.

Figure 2A:
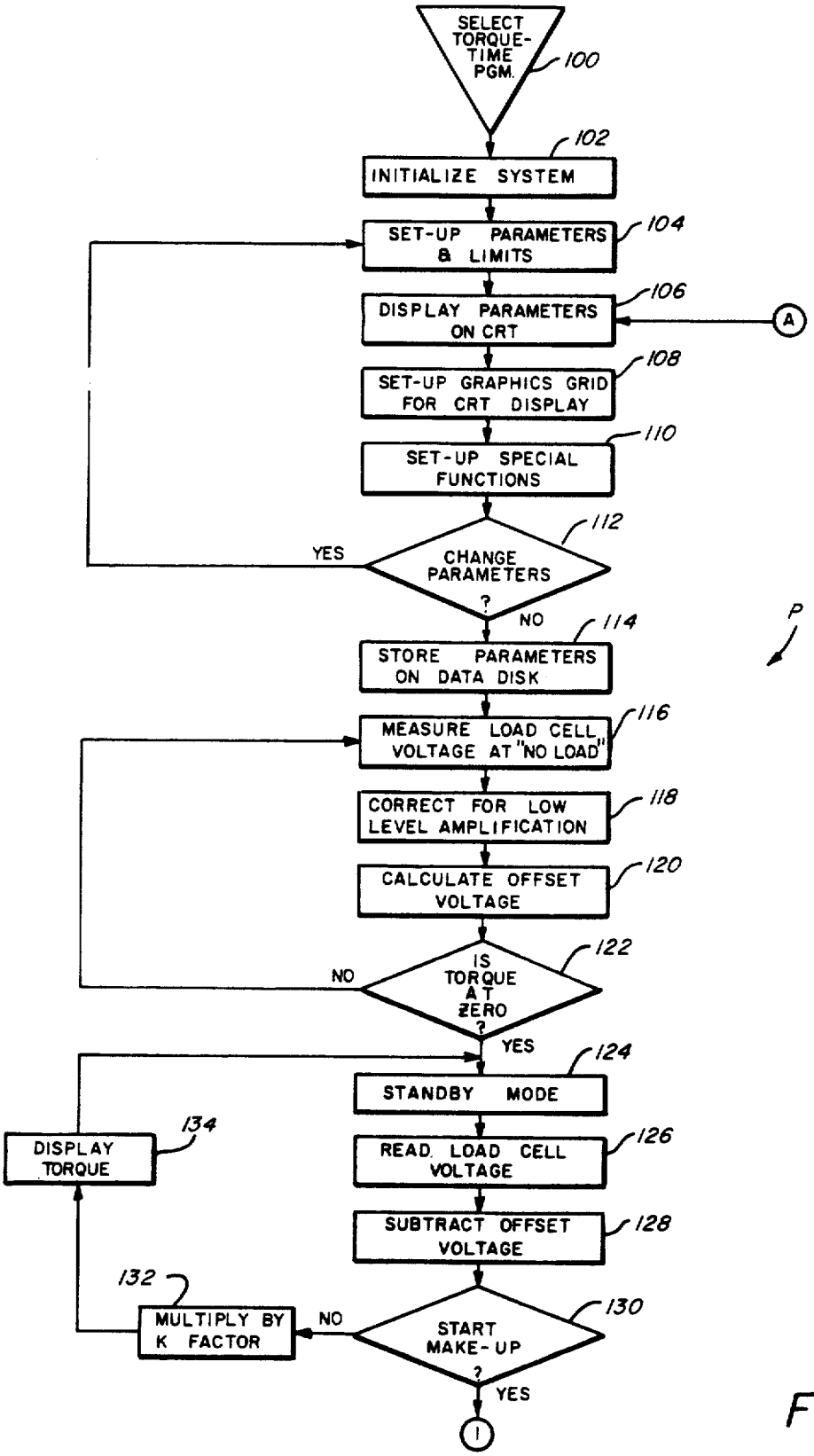
FIGS. 2A, 2B, 2C and 2D are schematic flow chart diagrams for the operation of the apparatus of FIG. 1 to achieve the desired results of the present invention.
Figure 2B:
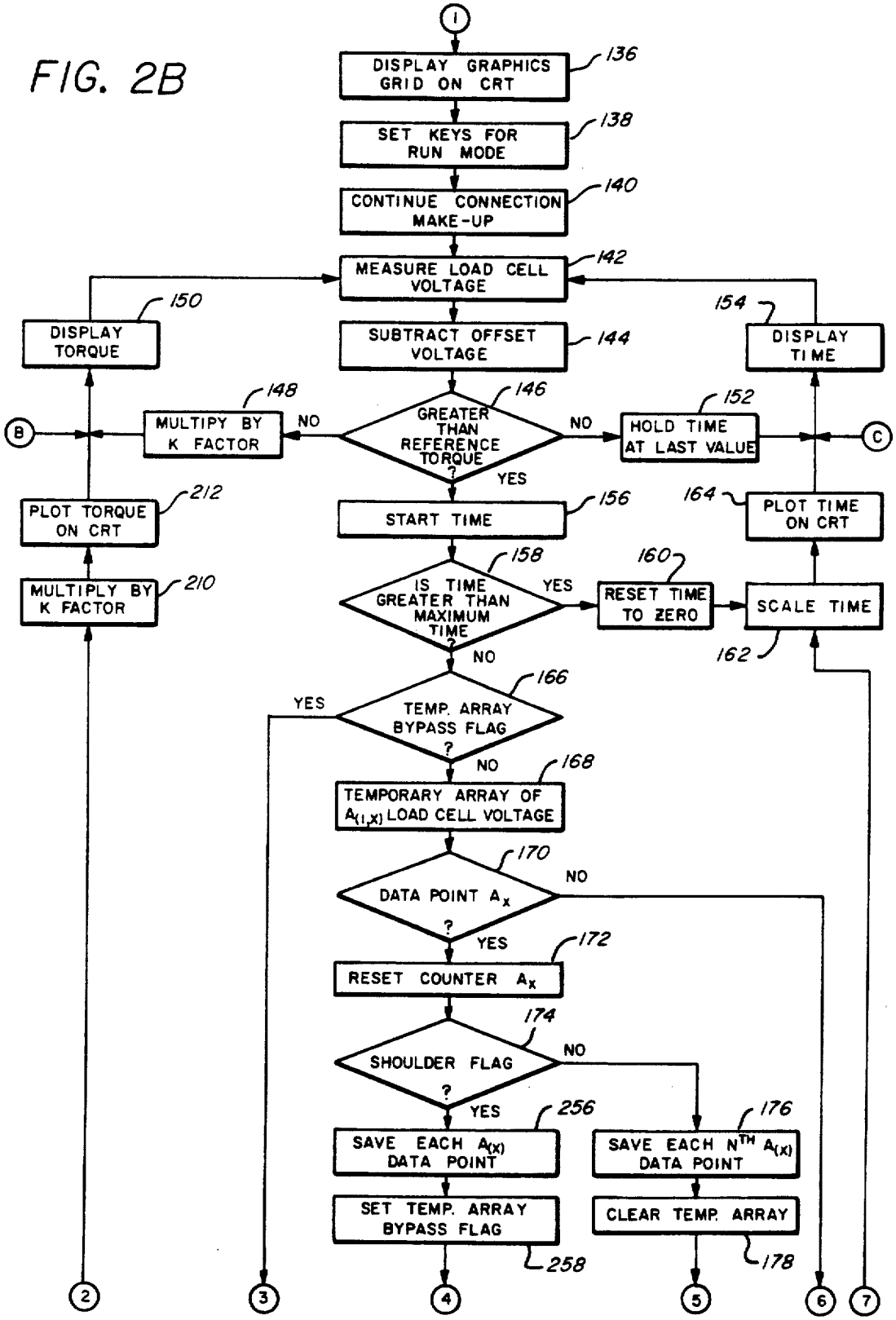
Figure 2C:
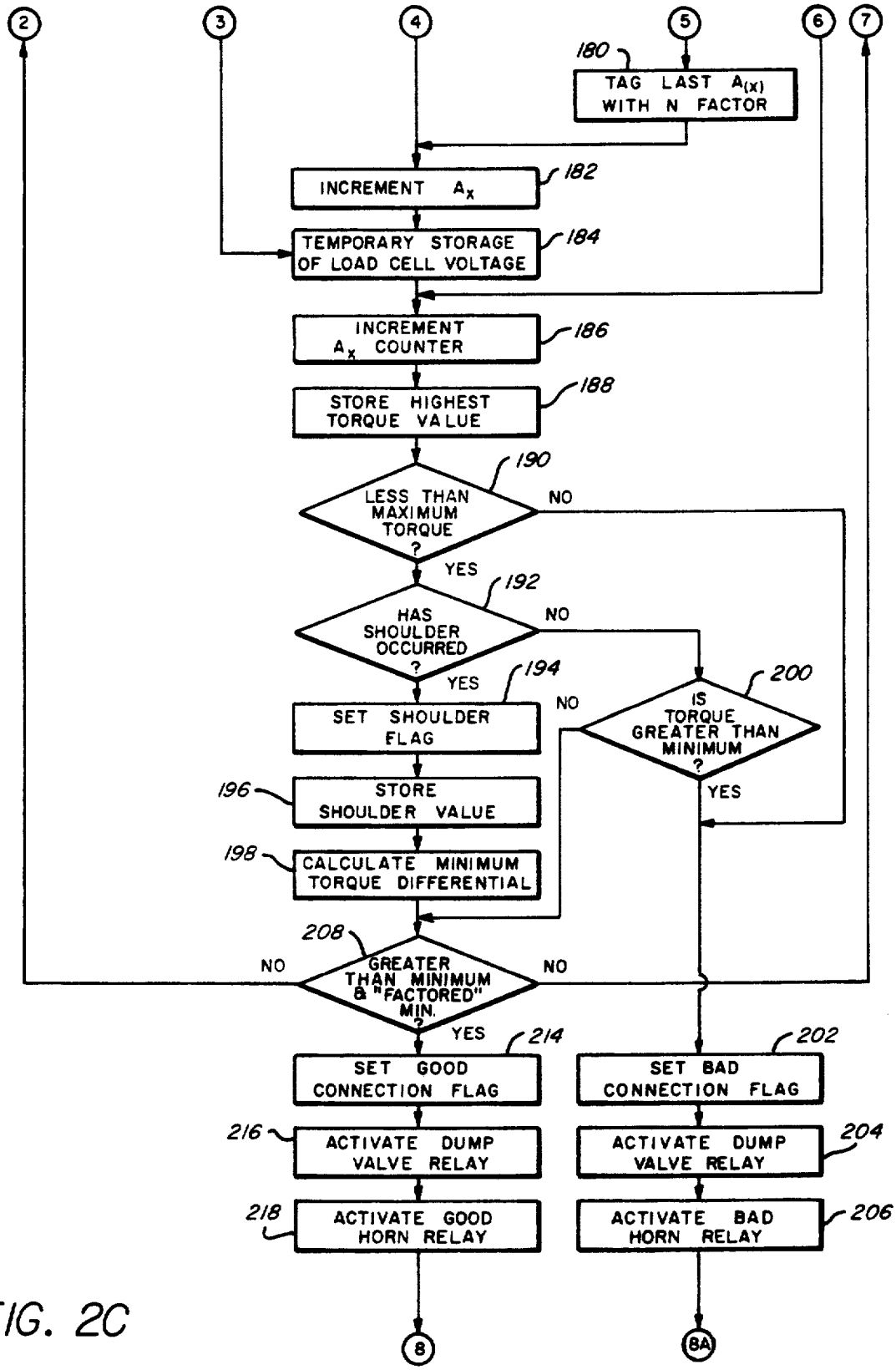
Figure 2D:
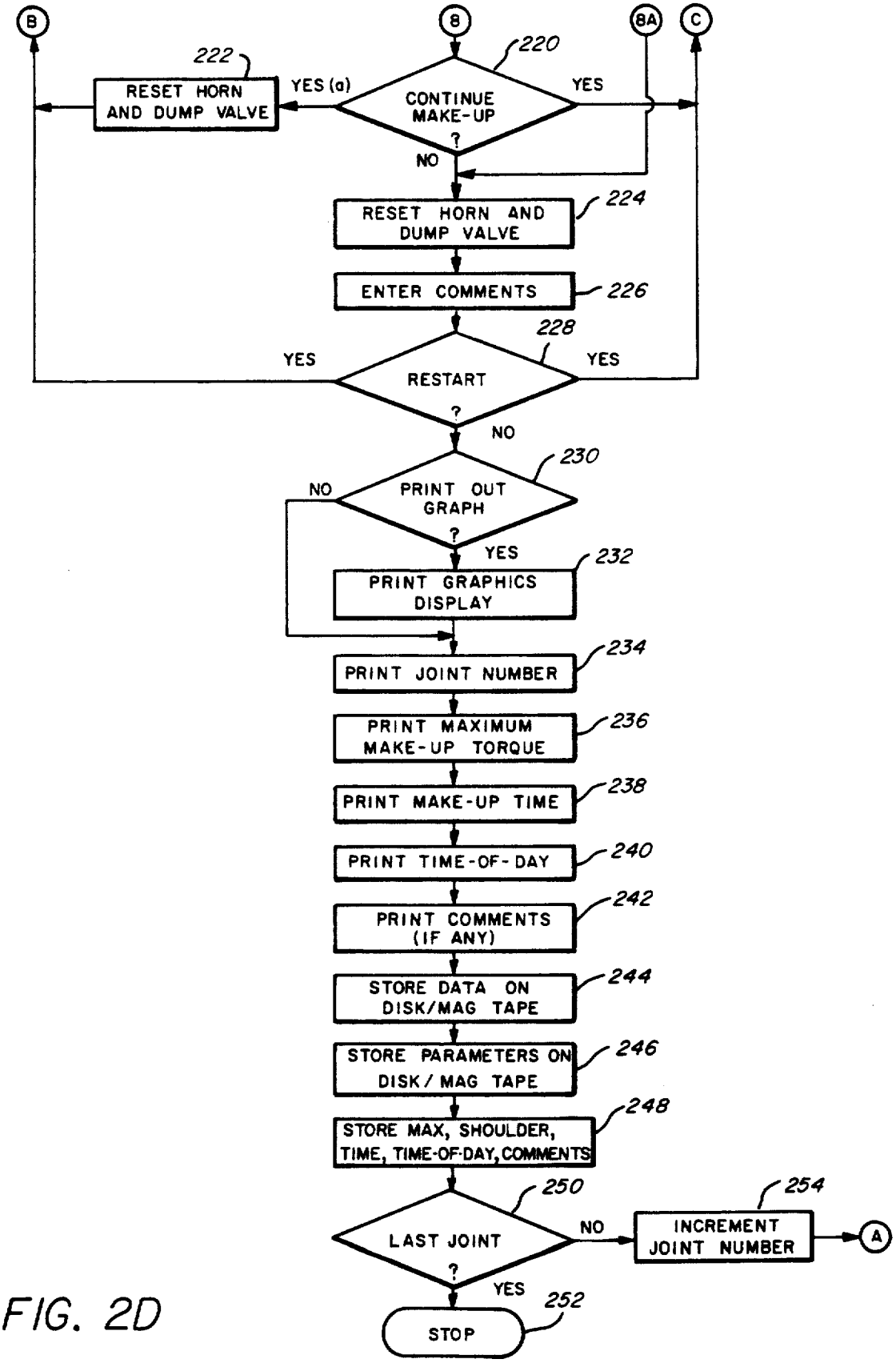

In the event that the operator does not wish to continue make-up of the connection in question in response to decision instruction 220, or in the event that a bad connection has been detected, control is transferred to an instruction 224 which causes both horn and dump valve relay to be reset, after which the operator may enter any comments that seem to be appropriate into the memory of computer C during performance of an instruction 226 (FIG. 2D). Control is then transferred to an instruction 228 which queries the operator as to whether or not torquing operations should be restarted. If the operator activates the restart key, decision 228 transfers control of the computer to instructions 210 and 162 (FIG. 2B) for continuous and further operation.

In the event that the operator does not indicate that torquing operations should be restarted in response to decision instruction 228, control is transferred to a decision instruction 230 which queries the operator as to whether or not the graphical display of torque as a function of time is to be printed. In the event that the operator indicates that a graphical display is to be printed, control is transferred to an instruction 232 which causes the printing operation to be performed. After the graphics display is printed, or in the event no graphics display is indicated as necessary in response to decision instruction 230, control is transferred to an instruction 234 which causes the Joint number to be printed. Thereafter, the maximum make-up torque is printed in response to an instruction 236, the make-up time for the connection is printed in instruction 23 and the time of day printed in response to an instruction 240. An instruction 242 permits the operator to print any comments felt necessary and the data obtained for the particular joint of pipe in question is stored in response to an instruction 244, while the specified input parameters are stored in response to an instruction step 246. Thereafter, an instruction step 248 causes the maximum torque, shoulder torque, make-up time, time of day and comments to be stored as well. An instruction 2S0 then causes the operator to indicate whether or not the last joint to be monitored has been monitored. If this is the case, a stop instruction 252 causes operation of the apparatus A to cease. If more connections or joints are to be monitored, an instruction 252 causes the joint number to be incremented, and control transferred to instruction 106 (FIG. 2A) for continuing operations.

As another feature of the present invention, during torque monitoring operations, after a shoulder condition has been detected, the number of readings stored and recorded can be expanded from the reduced number normally maintained prior to detection of a shoulder condition. As has been set forth above, when the shoulder condition is achieved as detected in decision instruction 192 (FIG. 2C), the shoulder flag 194 is set. During succeeding performance of measurement of the load cell voltage during step 142 and assignment of the measured voltage to a data point, decision instruction 174 (FIG. 2B) detects that the shoulder flag has been set and transfers control to an instruction 256 which causes the computer C to save each data point thereafter obtained and to set a temporary array bypass flag in the computer C during a step 258 so that each torque-time reading thereafter obtained may be stored for analytical purposes. This is done during the next iteration after the measurement of a load cell voltage by means of decision instruction 166 (FIG. 2B), which detects that the temporary array bypass flag has been set, so that each torque reading after shoulder conditions have been obtained is recorded and stored in memory. In this manner, valuable information as to the torque characteristics of a particular connection after shoulder conditions are obtained may be closely monitored.

V. EXAMPLES OF CONNECTIONS MONITORED WITH THE PRESENT INVENTION

By monitoring torque as a function of time with the present invention, not only can an unsatisfactory connection be detected, but also the reasons for the occurrence of the unsatisfactory connection can often be apparent to an operator either as the connection is being made up or afterwards. Thus, the operator may observe the torque versus time plot on a dynamic display as the connection is being made up and detect the reasons for the occurrence of an unsatisfactory connection. Alternatively, a printed record or display may be formed for use as an analytical tool for research purposes or as a teaching tool for training purposes. Several examples of torque-time displays of unsatisfactory connections which indicate the cause of a particular type of unsatisfactory connection are set forth in the drawings.

Figure 4A:
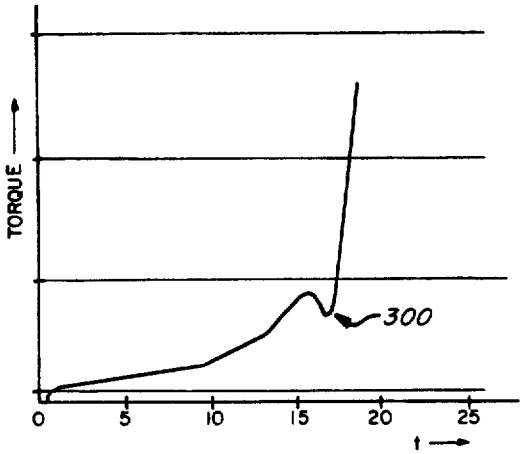
FIGS. 4A, 4B, 4C, 4D, 4E and 4F are graphical representations of torque measured as a function of time with the apparatus of FIG. 1 for various unsatisfactory premium tubular connection make up.

In FIG. 4A, a torque-time plot of the makeup of a premium threaded connection of the type having a synthetic resin, usually a fluorinated hydrocarbon, seal ring as an additional seal to the shoulder in a premium connection is set forth. In the portion of the plot in FIG. 4A indicated generally at 300, the torque values change from normally increasing ones, dropping substantially before the torque again begins increase as a function of time. It has been found with the present invention that such an occurrence is indicative of the seal ring being pushed out into the threads of the connection during make-up. This occurs under the influence of pressures imposed by the torque on the seal. This is usually caused either by the present of excess thread dope on the connection joints or because of the poor thread alignment.

Figure 4B:
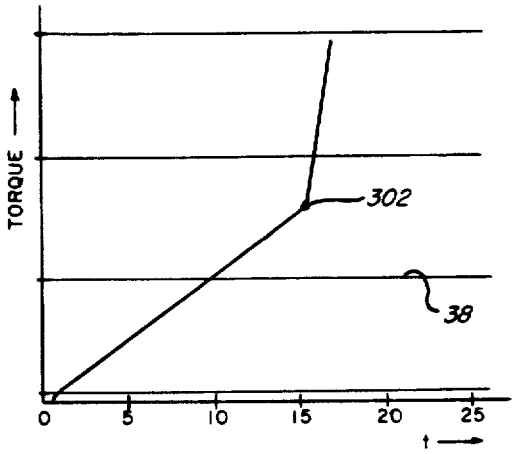
Figure 4C:
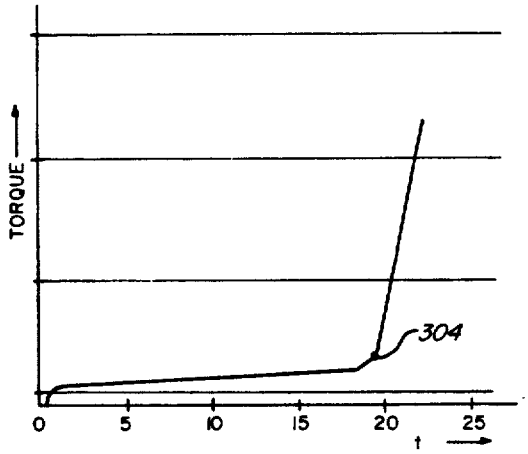
Figure 4D:
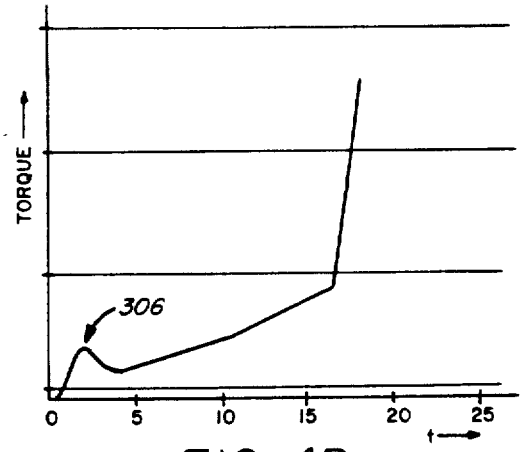
Figure 4E:
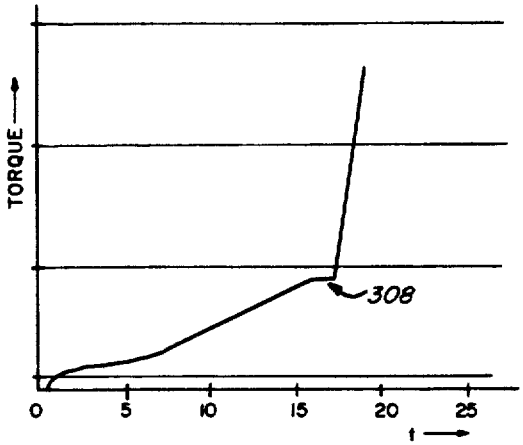
Figure 4F:
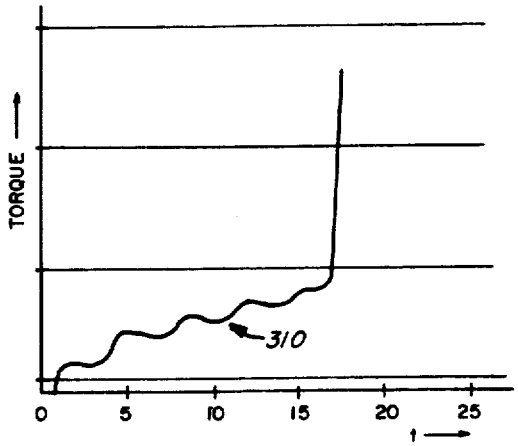

FIGS. 4B and 4C indicate two of the more common types of unsatisfactory connections. In FIG. 4B, the shoulder condition occurring at a point 302 is at an excessively high torque, above the acceptable limit defined by the line 38. Usually, this is due to thread tolerances not being proper, causing too much thread interference. In FIG. 4C, the shoulder condition occurring at a point 304 is at a very low torque and at a late time, almost twenty seconds, indicating insufficient thread engagement and that the connection is too loose. In FIG. 4D, the abrupt torque peak at point 306 early in the make-up of what would otherwise be a satisfactory connection indicates that one or both of the box and pin members in the connection has a shaved thread. In FIG. 4E a point 308 in what would be an otherwise satisfactory connection indicates the presence of a sand grain or grains in pipe dope at the nose of the pin member. This plateau or flat spot at 308 represents the time that the sand grain or grains are crushed, causing a small galled spot on the pin member. In FIG. 4F, the oscillation in torque values indicated at 310 prior to the presence of shoulder condition indicate that one or both of the box and pin members are out of round, usually due to a flat spot on a threaded surface.

Figure 5:
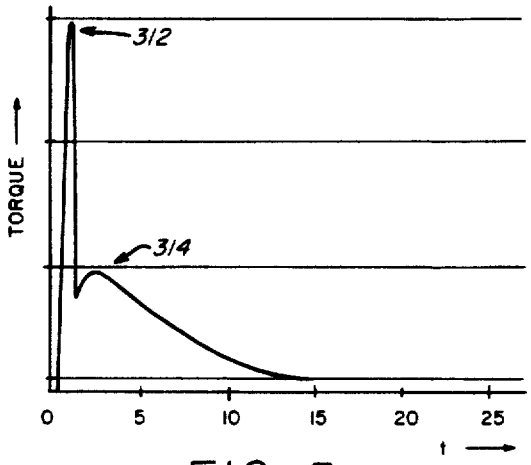
FIG. 5 is a graphical representation of torque measured as a function of time with the apparatus of FIG. 1 for a satisfactory disconnection or backout of a premium tubular connection.
Figure 6A:
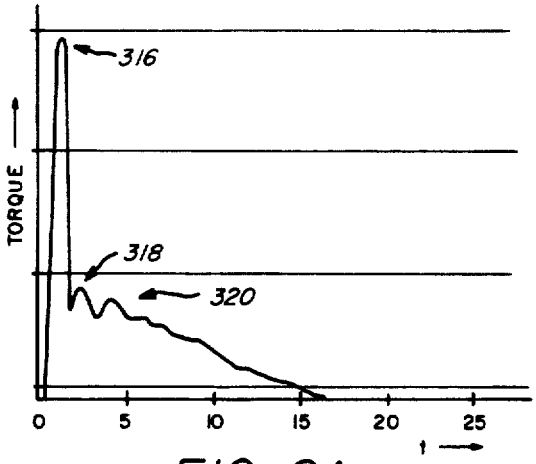
FIGS. 6A and 6B are graphical representations of torque measured as a function of time with the apparatus of FIG. 1 for disconnections of premium tubular connections indicative of thread galling in the connection.
Figure 6B:
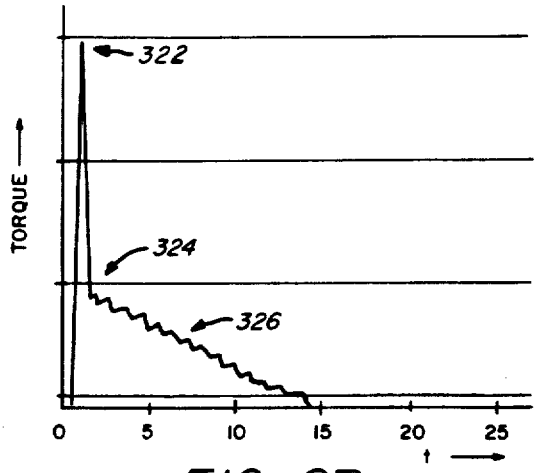

In addition, the apparatus A of the present invention may be used to monitor torque as a function of time as a premium threaded connection is being disconnected or backed out as commonly termed in the petroleum tubular industry. FIG. 5 indicates a plot of torque at a function of time for a satisfactory disconnection, rising to an initial peak torque very early in the backout or disconnection as indicated at 312, falling abruptly before rising to one minor prominence or bump at point 314 and decreasing in a generally linear manner thereafter. Another feature found useful in the apparatus of the present invention is that, by observing torque as a function of time during backout or disconnection is the ability is afforded to detect indications of galled thread in the connections. In FIG. 6A, a backout or disconnection of a premium threaded connection with galled threads is set forth. In contrast to the display in FIG. 5, the torque rather than decreasing substantially smoothly as a function of time after a first torque peak 316 and first bump or prominence 318, a second bump or prominence 320 is noted after which the torque decreases as a function of time in an uneven and ranged or rough manner. With the present invention, a torque-time plot of this kind is an indicator of galled thread in at least one of the premium threads in the connection being monitored. In FIG. 6B, a second example of advantages of the present invention in monitoring torque as a function of time during baekout of a premium threaded connection is set forth. In this situation, the torque rises to an initial high peak 322 and falls to a point 324 after which a number of successive peaks or saw teeth 326 are detected and displayed in the torque as a function of time. This type of display has been found, when used on pipe on a drilling rig, to be an indicator that the pipes being joined by the oonnection being monitored are moving or waving relative to each other, usually on a derrick at an oil rig and the ragged torque plot at 326 in FIG. 6B is indicative of damaged threads in the connection.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A method of monitoring torque conditions during the make-up of a threaded premium tubular connection, wherein shoulder contact for metal-to-metal seal is formed in the threaded connection, comprising the steps of:

(a) sensing the torque imposed on the connection during makeup;

(b) monitoring the torque conditions during said step of sensing the torque to detect if a satisfactory threaded connection is obtained;

(c) establishing a supplemental torque level for an acceptable minimum torque differential imposed after [metal-to-metal seal is formed] *shoulder contact; contact;*

(d) displaying the sensed torque as a function of time.

2. The method of claim 1, further including the step of:

forming an alarm indication when no threaded connection is obtained.

3. The method of claim *1*, further including the step of:

forming an alarm indication when an unsatisfactory connection is obtained.

4. The method of claim 1, further including the step of:

forming an indication of acceptability when a satisfactory threaded connection is obtained.

5. The method of claim 1, further including the step of:

establishing an acceptable maximum torque level for the threaded connection.

6. The method of claim 5, further including the step of:

forming an indication of whether or not the acceptable maximum torque level has been exceeded.

7. The method of claim 5, further including the steps of:

(a) forming a sum signal representing the sum of the acceptable minimum torque differential and the torque level at which metal-to-metal seal is actually achieved;

(b) comparing the sum signal with the acceptable maximum torque level;

(c) interrupting torquing of the connection when the sum signal exceeds the acceptable maximum torque level.

8. The method of claim 1, further including the step of:

establishing an acceptable minimum torque level for the threaded connection.

9. The method of claim 8, further including the step of:

forming an indication of whether or not the acceptable minimum torque level has been exceeded.

10. The method of claim 1, further including the step of:

forming an indication of whether or not the acceptable minimum torque differential is achieved.

11. A method of monitoring torque conditions during the make-up of a threaded premium tubular connection, wherein shoulder contact for metal-to-metal seal is formed in the threaded connection, comprising the steps of:

(a) sensing the torque imposed on the connection during makeup;

(b) [a] monitoring the torque conditions during said step of sensing the torque to detect if a satisfactory threaded connection is obtained;

(c) establishing a shoulder torque rate indicative of obtaining shoulder contact;

(d) displaying the sensed torque as a function of time.

12. The method of claim 11, wherein said step of monitoring torque conditions comprises the steps of:

(a) monitoring the torque imposed on the connection during successive time intervals;

(b) forming an indication of change in torque between each successive time interval;

(c) comparing the indication of change in torque with [a specified] *said* shoulder torque rate to detect whether or not [metal-to-metal] *a shoulder condition* is achieved.

13. The method of claim 12, further including the step of:

storing in a memory the monitored torque values for each successive time interval.

14. The method of claim 13, further including the step of:

selectively erasing from the memory a predetermined percentage of the monitored torque values obtained prior to [metal-to-metal seal being achieved] *shoulder contact.*

15. The method of claim 14, further including the step of:

ceasing said step of selectively erasing once [metal-to-metal seal] *shoulder contact* is achieved.

16. An apparatus for monitoring torque conditions during the make-up of a threaded premium tubular connection, wherein shoulder contact for metal-to-metal seal is formed in the threaded connection, comprising:

(a) means for sensing the torque imposed on the connection during makeup;

(b) means for monitoring the torque conditions during said step of sensing the torque to detect if a satisfactory threaded connection is obtained;

(c) means establishing a supplemental torque level for an acceptable minimum torque differential imposed after [metal-to-metal seal is formed] *shoulder contact*; and (d) means for displaying the sensed torque as a function of time.

17. The apparatus of claim 16, further including:

means for forming an alarm indication when no threaded connection is obtained.

18. The apparatus of claim 16, further including:

means for forming an alarm indication when an unsatisfactory connection is obtained.

19. The apparatus of claim 16, further including:

means for forming an indication of acceptability when a satisfactory threaded connection is obtained.

20. The apparatus of claim 16, further including:

means for establishing an acceptable maximum torque level for the threaded connection.

21. The apparatus of claim 20, further including:

means for forming an indication of whether or not the acceptable maximum torque level has been exceeded.

22. The apparatus of claim 20, further including:

(a) means for forming a sum signal representing the sum of the acceptable minimum torque differential and the torque level at which [metal-to-metal seal] *shoulder contact* is actually achieved;

(b) means for comparing the sum signal with the acceptable maximum torque level;

(c) means for interrupting torquing of the connection when the sum signal exceeds the acceptable maximum torque level.

23. The apparatus of claim 20, wherein the means for establishing a supplemental torque level includes:

means for establishing a shoulder torque rate indicative of obtaining shoulder contact.

24. The apparatus of claim 23, wherein said means for monitoring torque conditions comprises:

(a) means for monitoring the torque imposed on the connection during successive time intervals;

(b) means for forming an indication of change in torque between each successive time interval;

(c) means for comparing the indication of change in torque with [a specified] *said* shoulder torque rate to detect whether or not [metal-to-metal seal] *shoulder contact* is achieved.

25. The apparatus of claim 24, further including:

memory means for storing the monitored torque values for each successive time interval.

26. The apparatus of claim 25, further including:

means for selectively erasing from said memory means a predetermined percentage of the monitored torque values obtained prior to [metal-to-metal seal] *shoulder contact* being achieved.

27. The apparatus of claim 16, further comprising:

means for establishing an acceptable minimum torque level for the threaded connection.

28. The apparatus of claim 27, further including:

means for forming an indicative of whether or not the acceptable minimum torque level has been exceeded.

29. The apparatus of claim 16, further including:

means forming an indication of whether or not the acceptable minimum torque differential is achieved.

*30. A method of monitoring torque conditions during the make-up of a threaded tubular connection, wherein shoulder contact is formed in the threaded connection, comprising the steps of:*

*(a) sensing the torque imposed on the connection during makeup;*

*(b) monitoring the torque conditions during said step of sensing the torque to detect if a satisfactory threaded connection is obtained;*

*(c) establishing a supplemental torque level for an acceptable minimum torque differential imposed after shoulder contact; and*

*(d) displaying the torque sensed during make-up.*

*31. The method of claim 30, and including; comparing the monitored torque conditions with planned torque conditions from beginning to end of make-up to determine whether such a threaded connection would be acceptable for service.*

*32. The method of claim 31, and including; establishing an acceptable minimum torque level for the threaded connection, and forming an indication of whether or not the acceptable minimum torque level has been exceeded.*

*33. The method of claim 32, and including; establishing an acceptable maximum torque level for the threaded connection, and forming an indication of whether or not the acceptable maximum torque level has been exceeded.*

*34. The method of claim 30, and including: establishing an acceptable minimum torque level for the threaded connection, and forming an indication of whether or not the acceptable minimum torque level has been exceeded.*

*35. The method of claim 34, and including; establishing an acceptable maximum torque level for the threaded connection, and forming an indication of whether or not the acceptable maximum torque level has been exceeded.*

*36. A method for determining the torque required for shoulder contact when making up a threaded connection between tubular members which comprises*

*operating pipe connection apparatus to cause thread engagement by relative rotation of the tubular members in a make-up direction,*

*sensing the amount of torque being applied by said apparatus during make-up,*

*identifying from the sensed torque changes in torque rate during make-up, and*

*signalling shoulder contact in response to a change in torque rate.*

*37. A method as defined by claim 36, and including: monitoring the torque conditions during the sensing of the torque to detect if a satisfactory threaded connection is obtained.*

*38. A method as defined by claim 37, and including: adding the torque at shoulder contact to a predetermined minimum torque differential, and stopping the operation of the pipe connection apparatus when the sensed torque exceeds the sum of the torque at shoulder contact and the predetermined minimum torque differential.*

*39. A method as defined by claim 38, and including: stopping the operation of the pipe connection apparatus before the sensed torque reaches a predetermined maximum torque.*

*40. A method as defined by claim 36, and including: adding the torque at shoulder contact to a predetermined torque differential, and stopping the operation of the pipe connection apparatus when the sensed torque exceeds the sum of the torque at shoulder contact and the predetermined torque differential.*

*41. A method as defined by claim 40, and including: stopping the operation of the pipe connection apparatus before the sensed torque reaches a predetermined maximum torque.*

*42. A method of monitoring torque conditions during the make-up of a threaded tubular connection, wherein shoulder contact is formed in the threaded connection, comprising the steps of:*

*(a) sensing the torque imposed on the connection during make-up;*

*(b) establishing an acceptable minimum torque level for the threaded connection at shoulder contact;*

*(c) monitoring the torque conditions during said step of sensing the torque to identify the torque at shoulder contact;*

*(d) displaying the torque sensed during make-up;*

*(e) and forming an indication of whether or not the acceptable minimum torque level has been exceeded.*

*43. The method of claim 42 and including: establishing an acceptable maximum torque level for the threaded connection, and forming an indication of whether or not the acceptable maximum torque level has been exceeded.*

*44. A method of monitoring torque conditions during the make-up of a threaded tubular connection, wherein shoulder contact is formed in the threaded connection, comprising the steps of:*

(a) sensing the torque imposed on the connection during makeup;

(b) establishing an acceptable minimum torque level for the threaded connection at shoulder contact;

(c) monitoring the torque conditions during said step of sensing the torque to identify the torque at shoulder contact;

(d) displaying the torque sensed during make-up;

(e) comparing the monitored torque conditions with planned torque conditions from beginning to end of make-up to determine whether such a threaded connection would be acceptable for service, (f) and forming an indication of whether or not the acceptable minimum torque level has been exceeded.

45. The method of claim 44, and including: establishing an acceptable maximum torque level for the threaded connection, and forming an indication of whether or not the maximum torque level has been exceeded.

46. A method of monitoring torque conditions during the make-up of a threaded tubular connection, wherein shoulder contact is formed in the threaded connection, comprising the steps of:

(a) sensing the torque imposed on the connection during makeup;

(b) monitoring the torque conditions during said step of sensing the torque to detect if a satisfactory threaded connection is obtained;

(c) establishing a shoulder torque rate indicative of obtaining shoulder contact; and (d) displaying the torque sensed during make-up.

47. The method of claim 46, wherein said step of monitoring torque conditions comprises the steps of:

(a) monitoring the torque imposed on the connection during successive intervals;

(b) forming an indication of change in torque between each successive interval;

(c) comparing the indication of change in torque with said shoulder torque rate to detect whether or not a shoulder condition is achieved.

48. The method of claim 47, and including:

storing in a memory the monitored torque values for each successive interval.

49. The method of claim 48, further including the step of:

selectively erasing from the memory a predetermined percentage of the monitored torque values obtained prior to shoulder contact.

50. The method of claim 49, further including the step of:

ceasing said step of selectively erasing once shoulder contact is achieved.

51. An apparatus for monitoring torque conditions during the make-up of a threaded premium tubular connection, wherein shoulder contact is formed in the threaded connection, comprising:

(a) means for sensing the torque imposed on the connection during makeup;

(b) means for monitoring the torque conditions during said step of sensing the torque to detect if a satisfactory threaded connection is obtained;

(c) means establishing a supplemental torque level for an acceptable minimum torque differential imposed after shoulder contact; and (d) means for displaying the sensed torque.

52. The apparatus of claim 51, further including:

means for forming an alarm indication when no threaded connection is obtained.

53. The apparatus of claim 51, further including:

means of forming an alarm indication when an unsatisfactory connection is obtained.

54. The apparatus of claim 51, further including:

means for forming an indication of acceptability when satisfactory threaded connection is obtained.

55. The apparatus of claim 51, further including:

means for establishing an acceptable maximum torque level for the threaded connection.

56. The apparatus of claim 55, further including:

means for forming an indication of whether or not the acceptable maximum torque level has been exceeded.

57. The apparatus of claim 55, further including:

(a) means for forming a sum signal representing the sum of the acceptable minimum torque differential and the torque level at which shoulder contact is actually achieved;

(b) means for comparing the sum signal with the acceptable maximum torque level; and (c) means for interrupting torquing of the connection when the sum signal exceeds the acceptable maximum torque level.

58. The apparatus of claim 55, wherein the means for establishing a supplemental torque level includes:

means for establishing a shoulder torque rate indicative of obtaining shoulder contact.

59. The apparatus of claim 58, wherein said means for monitoring torque conditions comprises:

(a) means for monitoring the torque imposed on the connection during successive intervals;

(b) means for forming an indication of change in torque between each successive interval;

(c) means for comparing the indication of change in torque with said shoulder torque rate to detect whether or not shoulder contact is achieved.

60. The apparatus of claim 59, further including:

memory means for storing the monitored torque values for each successive interval.

61. The apparatus of claim 51, further including:

means for establishing an acceptable minimum torque level for the threaded connection.

62. The apparatus of claim 61, further including:

means for forming an indication of whether or not the acceptable minimum torque level has been exceeded.

63. A method for making up a shouldered threaded connection between tubular members which comprises, operating pipe connection apparatus to cause thread engagement by relative rotation of the tubular members in a make-up direction, sensing the amount of torque being applied by said apparatus during make-up, identifying from the sensed torque changes in torque rate during make-up, identifying from changes in torque rate the point at which shoulder contact is achieved, continuing to make-up the connection until the sensed torque exceeds the total of the torque at shoulder contact and a predetermined minimum torque differential, and stopping the make-up of the connection when the sensed torque exceeds the sum of the torque at shoulder contact and the predetermined minimum torque differential but is less than a predetermined maximum acceptable torque.

* * * * *